(12) United States Patent
Zhang et al.

(10) Patent No.: US 9,253,691 B2
(45) Date of Patent: Feb. 2, 2016

(54) METHOD, TERMINAL, BASE STATION, AND SYSTEM FOR ADJUSTING CONTROL PARAMETERS

(71) Applicant: Huawei Technologies Co., Ltd., Shenzhen, Guangdong (CN)

(72) Inventors: Tao Zhang, Beijing (CN); Shukun Wang, Shenzhen (CN); Bo Lin, Beijing (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 33 days.

(21) Appl. No.: 14/186,633

(22) Filed: Feb. 21, 2014

(65) Prior Publication Data

US 2014/0171083 A1 Jun. 19, 2014

Related U.S. Application Data (63) Continuation of application No. PCT/CN2012/080601, filed on Aug. 27, 2012.

(30) Foreign Application Priority Data

Aug. 25, 2011 (CN) .......................... 2011 1 0246807

(51) Int. Cl.
| | |
|---|---|
| H04W 36/00 | (2009.01) |
| H04W 36/32 | (2009.01) |
| H04W 36/34 | (2009.01) |
| H04W 36/24 | (2009.01) |

(52) U.S. Cl.
CPC ...... *H04W 36/0061* (2013.01); *H04W 36/0083* (2013.01); *H04W 36/32* (2013.01); *H04W 36/34* (2013.01); *H04W 36/24* (2013.01)

(58) Field of Classification Search
USPC .................................................. 455/436–448
See application file for complete search history.

(56) References Cited

U.S. PATENT DOCUMENTS

| | | | |
|---|---|---|---|
| 2010/0173626 | A1 | 7/2010 | Catovic et al. |
| 2011/0086635 | A1 | 4/2011 | Grob-Lipski |

FOREIGN PATENT DOCUMENTS

| | | | |
|---|---|---|---|
| CN | 1852562 | A | 10/2006 |
| CN | 101730065 | A | 6/2010 |
| CN | 101841835 | A | 9/2010 |
| CN | 101848476 | A | 9/2010 |
| CN | 101959263 | A | 1/2011 |
| CN | 102131216 | A | 7/2011 |
| CN | 102256318 | A | 11/2011 |

(Continued)

OTHER PUBLICATIONS

"Report email #05: intra-LTE mobility failures," 3GPP TSG-RAN WG3 Meeting #75-bis, San Jose del Cabo, Mexico, R3-120480, 3rd Generation Partnership Project, Valbonne, France (Mar. 26-30, 2012).

(Continued)

*Primary Examiner* — Joel Ajayi
(74) *Attorney, Agent, or Firm* — Leydig, Voit & Mayer, Ltd.

(57) ABSTRACT

The present invention discloses a method for adjusting control parameters. The method includes: when a terminal fails to be handed over from a source cell to a target cell, or when the terminal is handed over from a source cell to a target cell successfully and a radio link connection failure occurs on a radio link established between the terminal and the target cell, reestablishing, by the terminal, a radio link with a reestablished cell; and sending, by the terminal, a report message to a base station of the reestablished cell, where the report message carries moving speed information of the terminal and/or size information of the target cell.

16 Claims, 5 Drawing Sheets

(56) References Cited

FOREIGN PATENT DOCUMENTS

| JP | 2010501132 A | 1/2010 |
| JP | 2012514948 A | 6/2012 |
| WO | WO 2008020280 A8 | 2/2008 |
| WO | WO 2010080848 A1 | 7/2010 |

OTHER PUBLICATIONS

"$3^{rd}$ Generation Partnership Project; Technical Specification Group Radio Access Network; Evolved Universal Terrestrial Radio Access Network (E-UTRAN); X2 application protocol (X2AP) (Release 10)," 3GPP TS 36.423, V10.2.0, pp. 1-130, $3^{rd}$ Generation Partnership Project, Valbonne, France (Jun. 2011).

"$3^{rd}$ Generation Partnership Project, Technical Specification Group Radio Access Network; Evolved Universal Terrestrial Radio Access (E-UTRA); Radio Resource Control (RRC); Protocol specification (Release 10)," 3GPP TS 36.311, V10.2.0, pp. 1-294, $3^{rd}$ Generation Partnership Project, Valbonne, France (Jun. 2011).

"$3^{rd}$ Generation Partnership Project, Technical Specification Group Radio Access Network; Evolved Universal Terrestrial Radio Access (E-UTRA); Radio Resource Control (RRC); Protocol specification (Release 10)," 3GPP TS 36.331, V10.2.0, pp. 1-294, $3^{rd}$ Generation Partnership Project, Valbonne, France (Jun. 2011).

METHOD, TERMINAL, BASE STATION, AND SYSTEM FOR ADJUSTING CONTROL PARAMETERS

CROSS-REFERENCE TO RELATED APPLICATION

This application is a continuation of International Patent Application No. PCT/CN2012/080601, filed on Aug. 27, 2012, which claims priority to Chinese Patent Application No. 201110246807.X, filed on Aug. 25, 2011, both of which are hereby incorporated by reference in their entireties.

TECHNICAL FIELD

The present invention relates to the field of communications technologies, and in particular, to a method, terminal, base station, and system for adjusting control parameters.

BACKGROUND

When a terminal is in a connected state, a source cell provides value of a mobility control parameter for the terminal, and the source cell may hand over the terminal to a target cell:

if the handover fails, the terminal may select a reestablished cell and reestablish a radio link with the reestablished cell; or if the handover succeeds but a radio link connection failure occurs between the terminal and the target cell later, the terminal may also select a reestablished cell and reestablish a radio link with the reestablished cell.

In the foregoing two cases, the reestablished cell may be the source cell, or the target cell, or a cell other than the source cell and the target cell.

The mobility control parameter sent by the source cell after the terminal establishes a connection with the source cell may include a handover control parameter, a terminal moving state control parameter, a target cell size control parameter, and so on. The handover control parameter includes time to trigger (Time To Trigger) a measurement event, an offset of the measurement event, layer 1 filtering time T, a layer 3 filtering coefficient K, and so on. The terminal moving state control parameter includes a scale factor sf-High corresponding to a high moving state, a scale factor sf-Medium corresponding to a medium moving state, and so on. The target cell size control parameter includes a scale factor sf-Large corresponding to a large cell, a scale factor sf-Small corresponding to a small cell, and so on.

The terminal detects its moving state, and selects a corresponding scale factor according to its moving state to scale the handover control parameter. Using Time To Trigger as an example:

when the UE detects that the UE itself is in the high moving state, the UE scales the handover control parameter as follows:

Time To Trigger1=Time To Trigger×sf-High;

when the UE detects that the UE itself is in the medium moving state, the UE scales Time To Trigger as follows:

Time To Trigger2=Time To Trigger×sf-Medium;

when the UE detects that the UE itself is in a normal moving state, the UE does not scale Time To Trigger.

Definitely, Time To Trigger is merely used as an example for description herein. Other handover control parameters may also be scaled in the preceding manner.

After scaling is performed according to the moving state, the UE determines the size of the target cell, and selects a corresponding cell size scale factor according to the size of the target cell to scale the handover control parameter. Still using Time To Trigger as an example:

after scaling is performed according to the moving state, for example, after scaling is performed according to the high moving state, when the UE determines that the target cell is a large cell, the UE scales Time To Trigger3 as follows:

Time To Trigger3=Time To Trigger1×sf-Large;

after scaling is performed according to the moving state, for example, after scaling is performed according to the medium moving state, when the UE determines that the target cell is a small cell, the UE scales Time To Trigger4 as follows:

Time To Trigger4=Time To Trigger2×sf-Small;

when the UE determines that the target cell is a normal cell, the UE does not scale Time To Trigger any longer.

Definitely, whether scaling according to the moving state is performed first or scaling according to the cell size is performed first has no impact on the final scaling effect, and the sequence may be reversed.

The UE uses the scaled handover control parameter to control the current handover process.

The mobility control parameter in the prior art have a great impact on moving performance of the UE. To achieve a better balance between a UE link connection failure rate and a UE ping-pong handover rate, a base station in the prior art needs to perform a lot of outdoor tests, data collection, and statistical analyses to determine proper values of these control parameters beforehand, and is incapable of automatically adjusting the mobility control parameter used by the terminal.

SUMMARY

Embodiments of the present invention provide a method for adjusting control parameters, so that a base station can automatically adjust a mobility control parameter used by a terminal, and that a better balance between a terminal link connection failure rate and a terminal ping-pong handover rate is achieved. Embodiments of the present invention further provide a corresponding terminal and base station.

A method for adjusting control parameters includes:

when a terminal fails to be handed over from a source cell to a target cell, or when the terminal is handed over from a source cell to a target cell successfully and a radio link connection failure occurs on a radio link established between the terminal and the target cell, reestablishing, by the terminal, a radio link with a reestablished cell; and sending, by the terminal, a report message to a base station of the reestablished cell, where the report message carries moving speed information of the terminal and/or size information of the target cell, so that the base station of the reestablished cell adjusts a mobility control parameter according to the moving speed information of the terminal and/or the size information of the target cell and sends the adjusted mobility control parameter to the terminal.

A method for adjusting control parameters includes:

receiving, by a base station of a reestablished cell, a report message sent by a terminal, where the report message carries moving speed information of the terminal and/or size information of a target cell, and receiving an identifier of the target cell or an identifier of a source cell sent by the terminal; and sending, by the base station of the reestablished cell, a radio link failure indication message to a base station of the target cell or a base station of the source cell according to the identifier of the target cell or the identifier of the source cell, where the radio link failure indication message carries the moving speed information of the terminal and/or the size information of the target cell, so that the base station of the target cell or the base station of the source cell adjusts a mobility control parameter according to the moving speed information of the terminal and/or the size information of the target cell and sends the adjusted mobility control parameter to the terminal.

A method for adjusting control parameters includes:

receiving, by a base station of a target cell, a radio link failure indication message sent by a base station of a reestablished cell, where the radio link failure indication message carries moving speed information of a terminal and/or size information of the target cell; and sending, by the base station of the target cell, a handover report message to a base station of a source cell, where the handover report message carries the moving speed information of the terminal and/or the size information of the target cell, so that the base station of the source cell adjusts a mobility control parameter according to the moving speed information of the terminal and/or the size information of the target cell and sends the adjusted mobility control parameter to the terminal.

A method for adjusting control parameters includes:

receiving, by a base station of a source cell, a radio link failure indication message sent by a base station of a reestablished cell or a handover report message sent by a base station of a target cell, where the radio link failure indication message or handover report message carries moving speed information of a terminal and/or size information of the target cell; and adjusting a mobility control parameter according to the moving speed information of the terminal and/or the size information of the target cell, and sending the adjusted mobility control parameter to the terminal.

A terminal includes:

a radio link reestablishing unit, configured to reestablish a radio link with a reestablished cell when the terminal fails to be handed over from a source cell to a target cell, or when the terminal is handed over from a source cell to a target cell successfully and a radio link connection failure occurs on a radio link established between the terminal and the target cell; and a sending unit, configured to send a report message to a base station of the reestablished cell after the radio link reestablishing unit reestablishes the radio link with the reestablished cell, where the report message carries speed information of the terminal and/or size information of the target cell, so that the base station of the reestablished cell adjusts a mobility control parameter according to the moving speed information of the terminal and/or the size information of the target cell and sends the adjusted mobility control parameter to the terminal.

A base station includes:

a first receiving unit, configured to receive a report message sent by a terminal, where the report message carries moving speed information of the terminal and/or size information of a target cell, and receive an identifier of the target cell or an identifier of a source cell sent by the terminal; and a first sending unit, configured to send a radio link failure indication message to a base station of the target cell or a base station of the source cell according to the identifier of the target cell or the identifier of the source cell, where the radio link failure indication message carries the moving speed information of the terminal and/or the size information of the target cell, so that the base station of the target cell or the base station of the source cell adjusts a mobility control parameter according to the moving speed information of the terminal and/or the size information of the target cell and sends the adjusted mobility control parameter to the terminal.

A base station includes:

a second receiving unit, configured to receive a radio link failure indication message sent by a base station of a reestablished cell, where the radio link failure indication message carries moving speed information of a terminal and/or size information of the target cell; and a second sending unit, configured to send a handover report message to a base station of a source cell, where the handover report message carries the moving speed information of the terminal and/or the size information of the target cell, so that the base station of the source cell adjusts a mobility control parameter according to the moving speed information of the terminal and/or the size information of the target cell and sends the adjusted mobility control parameter to the terminal.

A base station includes:

a third receiving unit, configured to receive a radio link failure indication message sent by a base station of a reestablished cell or a handover report message sent by a base station of a target cell, where the radio link failure indication message or handover report message carries moving speed information of a terminal and/or size information of the target cell;

a third parameter adjusting unit, configured to adjust a mobility control parameter according to the moving speed information of the terminal and/or the size information of the target cell carried in the radio link failure indication message or handover report message received by the third receiving unit; and a third sending unit, configured to send the mobility control parameter adjusted by the third parameter adjusting unit to the terminal.

A system for adjusting control parameters includes a terminal, a first base station, a second base station, and a third base station, where:

when the terminal fails to be handed over from the first base station to the second base station, or when the terminal is handed over from the first base station to the second base station successfully and a radio link connection failure occurs on a radio link established between the terminal and the second base station, the terminal reestablishes a radio link with the third base station and sends a report message to the third base station, where the report message carries speed information of the terminal and/or size information of the target cell;

after the third base station receives the report message sent by the terminal and receives an identifier of the target cell or an identifier of a source cell sent by the terminal, the third base station sends a radio link failure indication message to the second base station or the first base station according to the identifier of the target cell or the identifier of the source cell, where the radio link failure indication message carries the moving speed information of the terminal and/or the size information of the target cell;

after the second base station receives the radio link failure indication message sent by the third base station, the second base station sends a handover report message to the first base station according to the identifier of the source cell, where the handover report message carries the moving speed information of the terminal and/or the size information of the target cell;

the first base station receives the radio link failure indication message sent by the third base station or the handover report message sent by the second base station, where the radio link failure indication message or handover report message carries the moving speed information of the terminal and/or the size information of the target cell; and the first base station adjusts a mobility control parameter according to the moving speed information of the terminal and/or the size information of the target cell, and sends the adjusted mobility control parameter to the terminal.

In the embodiments of the present invention, the terminal sends a report message to the reestablished cell, where the report message carries speed information of the terminal and/or size information of the target cell; the reestablished cell sends a radio link failure indication message to the target cell or source cell; the source cell receives the radio link failure indication message sent by the reestablished cell or a handover report message sent by the target cell, where the radio link failure indication message or handover report message carries the moving speed information of the terminal and/or the size information of the target cell; and the source cell adjusts a mobility control parameter according to the moving speed information of the terminal and/or the size information of the target cell and sends the adjusted mobility control parameter to the terminal.

Compared with the prior art in which control parameters are adjusted manually after the source cell delivers initial a value of a mobility control parameter, the method for adjusting control parameters that is provided in the embodiments of the present invention allows the source cell to automatically adjust a mobility control parameter according to the moving speed information of the terminal and/or the size information of the target cell, thereby ensuring a better balance between a terminal link connection failure rate and a terminal ping-pong handover rate.

DESCRIPTION OF EMBODIMENTS

Embodiments of the present invention provide a method for adjusting control parameters, so that a base station can automatically adjust a mobility control parameter used by a terminal, and that a better balance between a terminal link connection failure rate and a terminal ping-pong handover rate is achieved. Embodiments of the present invention further provide a corresponding terminal, base station, and system. The embodiments of the present invention are hereinafter described in detail.

The mobility control parameter includes parameters related to mobility of the terminal.

Figure 1:
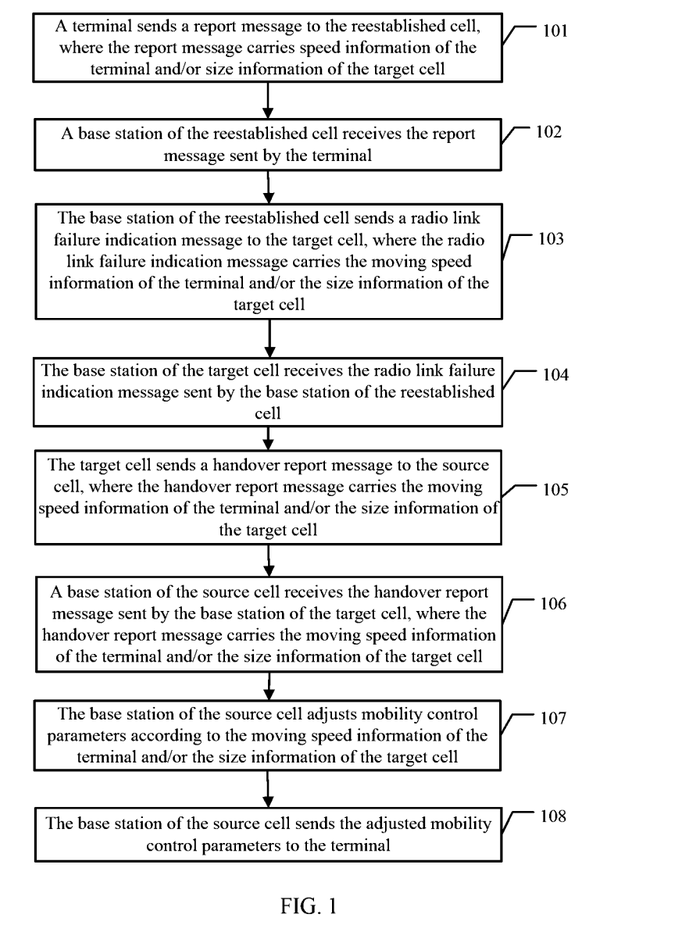
FIG. 1 is a schematic diagram of an embodiment of a method for adjusting control parameters according to an embodiment of the present invention.

Referring to FIG. 1, an embodiment of a method for adjusting control parameters according to an embodiment of the present invention includes:

101. A terminal sends a report message to a reestablished cell, where the report message carries speed information of the terminal and/or size information of a target cell.

After the terminal establishes a connection with a source cell, the source cell sends initial value of a mobility control parameter to the terminal, where the mobility control parameter include a handover control parameter, a terminal moving state control parameter, a target cell size control parameter, and so on. The handover control parameter includes parameters related to a handover process, and the terminal moving state control parameter includes parameters related to a terminal moving state. The handover control parameter includes time to trigger (Time To Trigger) a measurement event, an offset of the measurement event, layer 1 filtering time T, a layer 3 filtering coefficient K, and so on. The terminal moving state control parameter includes a scale factor sf-High corresponding to a high moving state, a scale factor sf-Medium corresponding to a medium moving state, and so on. The target cell size control parameter includes a scale factor sf-Large corresponding to a large cell, a scale factor sf-Small corresponding to a small cell, and so on. Initial values of the mobility control parameter are specific values of the above parameters.

The terminal detects its moving state, and selects a corresponding scale factor according to its moving state to scale the handover control parameter. Using Time To Trigger as an example:

when the UE detects that the UE itself is in the high moving state, the UE scales Time To Trigger as follows:

$$\text{Time To Trigger1} = \text{Time To Trigger} \times \text{sf-High};$$

after scaling is performed according to the moving state, the UE determines the size of the target cell, and selects a corresponding cell size scale factor according to the size of the target cell to scale Time To Trigger:

after scaling is performed according to the moving state, for example, after scaling is performed according to the high moving state, when the UE determines that the target cell is a small cell, the UE scales Time To Trigger1 as follows:

$$\text{Time To Trigger3} = \text{Time To Trigger1} \times \text{sf-Small}.$$

Herein, Time To Trigger is merely used as an example for description. Other handover control parameters may also be scaled in the preceding manner. The UE is handed over to the target cell successfully according to the scaled handover control parameter. Afterward, the radio link between the terminal and the target cell fails, and the terminal reestablishes a radio link with the reestablished cell.

After the terminal reestablishes a radio link with the reestablished cell, the terminal sends a report message to the reestablished cell, where the report message carries the moving speed information of the terminal and/or the size information of the target cell.

The speed information may be moving state information of the terminal, where the moving state information of the terminal includes the terminal being in the high moving state, medium moving state, or normal moving state. A basis for classifying moving states may be the number of UE handovers within a specific period of time. For example, if the number of UE handovers within the specific time is greater than 10, the UE is in the high moving state; if the number of UE handovers within the specific time is less than 10 but greater than 5, the UE is in the medium moving state; if the number of UE handovers within the specific time is less than 5, the UE is in the normal moving state. Definitely, herein the principle for classifying moving states of the UE is described by using only an example, and specific values of boundaries may be different.

The size information of the target cell may be that the target cell is a large cell, or a medium cell, or a small cell, or a pico cell. A basis for classifying cell sizes may be power of a base station of the cell. For example, if power of the base station of the cell is higher than 10 W, the cell is a large cell; if power of the base station of the cell is higher than 5 W but lower than 10 W, the cell is a medium cell; if power of the base station of the cell is higher than 3 W but lower than 5 W, the cell is a small cell; if power of the base station of the cell is lower than 3 W, the cell is a pico cell. Definitely, herein the principle for classifying the cell size is described by using only an example, and specific values of boundaries may be different. The UE may obtain the size information of the target cell in multiple manners For example, the target cell may send its power or size information by using system broadcast or dedicated signaling, and the UE deduces the size information of the target cell according to power of the target cell obtained by receiving the system broadcast or dedicated signaling of the target cell (the dedicated signaling may be directly sent by the target cell to the UE, or may also be forwarded by the source cell to the UE), or directly obtains the size information of the target cell, and so on.

The report message further carries an event type flag and/or a mobility control parameter, where the mobility control parameter includes one or any combination of a handover control parameter, a terminal moving state control parameter, and a target cell size control parameter, and the event type flag indicates that the event type is a radio link failure.

The report message further carries an identifier of the target cell or an identifier of the source cell.

102. A base station of the reestablished cell receives the report message sent by the terminal.

The report message carries the speed information of the terminal and/or the size information of the target cell.

103. The base station of the reestablished cell sends a radio link failure indication message to the target cell, where the radio link failure indication message carries the moving speed information of the terminal and/or the size information of the target cell.

The reestablished cell learns, according to the event type flag and the identifier of the target cell carried in the report message, that the terminal fails to be handed over to the target cell, and therefore sends a radio link failure indication message to the target cell, notifying the target cell that the terminal reestablishes a radio link in the reestablished cell after the terminal fails to be handed over to the target cell, where the radio link failure indication message includes the moving speed information of the terminal and/or the size information of the target cell.

The radio link failure indication message further carries the identifier of the source cell.

104. The base station of the target cell receives the radio link failure indication message sent by the base station of the reestablished cell.

The base station of the target cell receives the radio link failure indication message sent by the base station of the reestablished cell, where the radio link failure indication message carries the moving speed information of the terminal and/or the size information of the target cell, and the radio link failure indication message further carries a mobility control parameter, where the mobility control parameter include one or any combination of the handover control parameter, terminal moving state control parameter, and target cell size control parameter.

105. The base station of the target cell sends a handover report message to the source cell, where the handover report message carries the moving speed information of the terminal and/or the size information of the target cell.

The target cell learns, according to the event type flag and the identifier of the source cell, that the radio link fails after the terminal is handed over from the source cell successfully, and therefore sends a handover report message to the source cell, where the handover report message carries the moving speed information of the terminal and/or the size information of the target cell, and the handover report message further carries a mobility control parameter, where the mobility control parameter include at least one of the handover control parameter, terminal moving state control parameter, and target cell size control parameter.

106. A base station of the source cell receives the handover report message sent by the target cell, where the handover report message carries the moving speed information of the terminal and/or the size information of the target cell.

The source cell learns, according to the received handover report, that the radio link fails after the terminal is handed over from the source cell to the target cell successfully.

107. The base station of the source cell adjusts a mobility control parameter according to the moving speed information of the terminal and/or the size information of the target cell.

The base station of the source cell adjusts the mobility control parameter according to the moving speed information of the terminal and/or the size information of the target cell carried in the handover report message, for example, learns, according to the moving speed information, that the terminal is in the high moving state, and learns, according to the size information of the target cell, that the target cell is a small cell. The base station of the source cell adjusts a mobility control parameter.

For example, the initial value of the mobility control parameter Time To Trigger is 10 ms, the scale factor sf-High corresponding to the high moving state is 0.9, and the scale factor sf-Small corresponding to a small cell is 0.8. The initial values cause a successful handover followed by a radio link failure between the UE and the target cell when the terminal is handed over to the target cell according to the parameter Time To Trigger=10* 0.9*0.8=7.2 ms. The terminal adjusts, according to the learned information that the terminal is in the high moving state and that the target cell is a small cell, Time To Trigger to 9 ms, sf-High to 0.8, and sf-Small to 0.7.

Herein only several parameters are used as examples for description. The source cell may also correspondingly adjust other mobility control parameters according to the moving speed information of the terminal and/or the size information of the target cell, so as to ensure a better balance between a terminal link connection failure rate and a terminal ping-pong handover rate.

108. The base station of the source cell sends the adjusted mobility control parameter to the terminal.

After adjusting the mobility control parameter, the source cell sends the adjusted mobility control parameter to the terminal, so as to ensure that the terminal performs a cell handover according to the adjusted mobility control parameter and ensure a better balance between a terminal link connection failure rate and a terminal ping-pong handover rate.

In the embodiment of the present invention, the terminal sends a report message to the reestablished cell, where the report message carries speed information of the terminal and/or size information of the target cell; the reestablished cell sends a radio link failure indication message to the target cell; the source cell receives a handover report message sent by the target cell, where the handover report message carries the moving speed information of the terminal and/or the size information of the target cell; and the source cell adjusts a mobility control parameter according to the moving speed information of the terminal and/or the size information of the target cell and sends the adjusted mobility control parameter to the terminal. Compared with the prior art in which control parameters are adjusted manually after the source cell delivers initial value of a mobility control parameter, the method for adjusting control parameters that is provided in the embodiment of the present invention allows the source cell to automatically adjust a mobility control parameter according to the moving speed information of the terminal and/or the size information of the target cell, thereby ensuring a better balance between a terminal link connection failure rate and a terminal ping-pong handover rate.

Optionally, on the basis of the foregoing embodiment, the reestablished cell may be the source cell or may also be the target cell: When the reestablished cell is the source cell, steps 103 to 106 may be omitted, and the base station of the source cell adjusts, after receiving the report message, parameters according to information carried in the report message; when the reestablished cell is the target cell, steps 103 and 104 may be omitted, and the base station of the target cell sends, after receiving the report message, information carried in the report message to the source cell, and the base station of the source cell adjusts parameters according to the information carried in the report message.

Optionally, in the foregoing embodiment, the source cell adjusts parameters every time after receiving a report message. Actually a threshold may be set. Parameters are adjusted only when a quantity of report messages reaches the set threshold. In the foregoing embodiment, if a threshold is set, when a quantity of handover report messages sent by the target cell and received by the source cell exceeds the set threshold, after step 106, the method further includes: classifying moving speed information of the terminal and/or size information of the target cell; and determining moving speed information of the terminal and/or size information of the target cell corresponding to a largest quantity of messages; and step 107 is modified to: adjusting a mobility control parameter according to the moving speed information of the terminal and/or the size information of the target cell corresponding to the largest quantity of messages.

The specific process may be described as: classifying moving speed information of the terminal carried in the radio link failure indication messages or handover report messages, determining quantities of radio link failure indication messages or handover report messages corresponding to types of moving speed information of the terminal after the classification, determining a type of moving speed information of the terminal corresponding to a largest quantity of radio link failure indication messages or handover report messages, adjusting the mobility control parameter according to the type of moving speed information of the terminal corresponding to the largest quantity of radio link failure indication messages or handover report messages, and sending the adjusted mobility control parameter to the terminal; or classifying size information of the target cell carried in the radio link failure indication messages or handover report messages, determining quantities of radio link failure indication messages or handover report messages corresponding to types of size information of the target cell after the classification, determining a type of size information of the target cell corresponding to a largest quantity of radio link failure indication messages or handover report messages, adjusting the mobility control parameter according to the type of size information of the target cell corresponding to the largest quantity of radio link failure indication messages or handover report messages, and sending the adjusted mobility control parameter to the terminal; or determining combination types of types of size information of the target cell and types of moving speed information of the terminal carried in the radio link failure indication messages or handover report messages, determining quantities of radio link failure indication messages or handover report messages corresponding to the combination types, determining a combination type corresponding to a largest quantity of radio link failure indication messages or handover report messages, adjusting the mobility control parameter according to the combination type corresponding to the largest quantity of radio link failure indication messages or handover report messages, and sending the adjusted mobility control parameter to the terminal.

Optionally, in the above embodiment, a threshold is set according to the quantity of received messages. Actually, every time after a message is received, namely, after step 106, moving speed information of the terminal and/or size information of the target cell carried in the handover report message may be classified, and a type of moving speed information of the terminal or a type of size information of the target cell or a combination type corresponding to the largest quantity of radio link failure indication messages or handover report messages may be determined; when the quantity of radio link failure indication messages or handover report messages corresponding to any type exceeds the set threshold, step 107 is modified to: adjusting a mobility control parameter according to a type of moving speed information of the terminal or a type of size information of the target cell or a combination type corresponding to a largest quantity of radio link failure indication messages or handover report messages.

In the foregoing embodiment, the process of adjusting a mobility control parameter by the source cell is described in detail. Actually the reestablished cell and target cell may also adjust parameters according to the moving speed information of the terminal and/or the size information of the target cell; or a threshold may also be set, and when a quantity of received messages reaches the set threshold, a mobility control parameter is adjusted according to the moving speed information of the terminal and/or the size information of the target cell corresponding to the largest quantity of messages, and the adjusted mobility control parameter are sent to the terminal.

Figure 2:
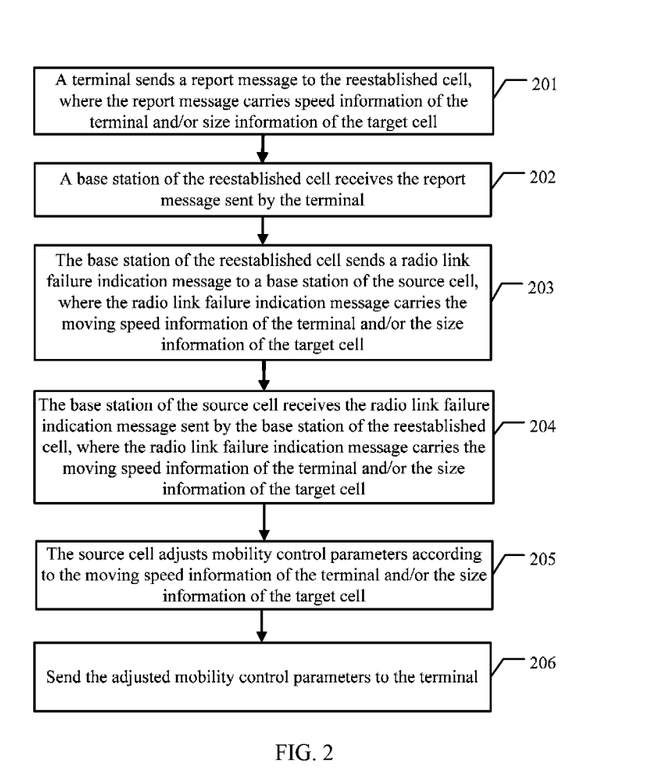
FIG. 2 is a schematic diagram of another embodiment of a method for adjusting control parameters according to an embodiment of the present invention.

Referring to FIG. 2, another embodiment of a method for adjusting control parameters according to an embodiment of the present invention includes:

201. A terminal sends a report message to a reestablished cell, where the report message carries speed information of the terminal and/or size information of a target cell.

After the terminal fails to be handed over from a source cell to the target cell, the terminal selects a reestablished cell, and after establishing a radio link with the reestablished cell, sends a report message to the reestablished cell, where the report message carries the moving speed information of the terminal and/or the size information of the target cell.

The speed information may be moving state information of the terminal, where the moving state information of the terminal is that the terminal is in a high moving state, medium moving state, or normal moving state. A basis for classifying moving states may be the number of UE handovers within a specific time. For example, if the number of UE handovers within the specific time is greater than 10, the UE is in the high moving state; if the number of UE handovers within the specific time is less than 10 but greater than 5, the UE is in the medium moving state; if the number of UE handovers within the specific time is less than 5, the UE is in the normal moving state. Definitely, herein the principle for classifying moving states of the UE is described by using only an example, and specific values of boundaries may be different.

The size information of the target cell is that the target cell is a large cell, or a medium cell, or a small cell, or a pico cell. A basis for classifying cell sizes may be power of a base station of the cell. For example, if power of the base station of the cell is higher than 10 W, the cell is a large cell; if power of the base station of the cell is higher than 5 W but lower than 10 W, the cell is a medium cell; if power of the base station of the cell is higher than 3 W but lower than 5 W, the cell is a small cell; if power of the base station of the cell is lower than 3 W, the cell is a pico cell. Definitely, herein the principle for classifying cell sizes is described by using only an example, and specific values of boundaries may be different. The UE may obtain the size information of the target cell in multiple manners For example, the target cell may send its power or size information by using system broadcast or dedicated signaling, and the UE deduces the size information of the target cell according to power of the target cell obtained by receiving the system broadcast or dedicated signaling of the target cell (the dedicated signaling may be directly sent by the target cell to the UE, or may also be forwarded by the source cell to the UE), or directly obtains the size information of the target cell, and so on.

The report message further carries an event type flag and/or a mobility control parameter, where the mobility control parameter include one or any combination of a handover control parameter, a terminal moving state control parameter, and a target cell size control parameter, and the event type flag indicates that an event type is a cell handover failure.

202. A base station of the reestablished cell receives the report message sent by the terminal.

The report message carries the speed information of the terminal and/or the size information of the target cell.

203. The base station of the reestablished cell sends a radio link failure indication message to the source cell, where the radio link failure indication message carries the moving speed information of the terminal and/or the size information of the target cell.

The base station of the reestablished cell sends a radio link failure indication message to a base station of the source cell, where the radio link failure indication message carries the moving speed information of the terminal and/or the size information of the target cell, and further carries an event type flag, which is a handover failure in this embodiment.

204. The base station of the source cell receives the radio link failure indication message sent by the reestablished cell, where the radio link failure indication message carries the moving speed information of the terminal and/or the size information of the target cell.

205. The base station of the source cell adjusts a mobility control parameter according to the moving speed information of the terminal and/or the size information of the target cell.

The radio link failure indication message further carries an event type flag, which is a handover failure in this embodiment. The source cell learns, according to the event type flag, that the terminal is handed over according to initial values of the mobility control parameter but the handover fails, and adjusts the mobility control parameter according to the moving speed information of the terminal and/or the size information of the target cell carried in the radio link failure indication message, so as to ensure a better balance between a terminal link connection failure rate and a terminal ping-pong handover rate.

206. The base station of the source cell sends the adjusted mobility control parameter to the terminal.

After adjusting the mobility control parameter, the base station of the source cell sends the adjusted mobility control parameter to the terminal, so as to ensure that the terminal performs a cell handover according to the adjusted mobility control parameter and ensure a better balance between a terminal link connection failure rate and a terminal ping-pong handover rate.

In the embodiment of the present invention, the terminal sends a report message to the reestablished cell, where the report message carries speed information of the terminal and/or size information of the target cell; the reestablished cell sends a radio link failure indication message to the source cell; the source cell receives the radio link failure indication message sent by the reestablished cell, where the radio link failure indication message carries the moving speed information of the terminal and/or the size information of the target cell; and the source cell adjusts a mobility control parameter according to the moving speed information of the terminal and/or the size information of the target cell and sends the adjusted mobility control parameter to the terminal. Compared with the prior art in which control parameters are adjusted manually after the source cell delivers initial value of mobility control parameter, the method for adjusting control parameters that is provided in the embodiment of the present invention allows the source cell to automatically adjust a mobility control parameter according to the moving speed information of the terminal and/or the size information of the target cell, thereby ensuring a better balance between a terminal link connection failure rate and a terminal ping-pong handover rate.

Optionally, on the basis of the foregoing embodiment, the reestablished cell may be the source cell or may also be the target cell. When the reestablished cell is the source cell, steps 203 and 204 may be omitted. After receiving the report message of the UE, the source cell adjusts parameters according to the information carried in the report message.

Optionally, in the above embodiment, the source cell adjusts parameters every time after receiving a report message. Actually a threshold may be set. Parameters are adjusted only when a quantity of report messages reaches the set threshold. In the foregoing embodiment, if a threshold is set, when a quantity of radio link failure indication messages sent by the reestablished cell and received by the source cell exceeds the set threshold, after step 204, the method further includes: classifying moving speed information of the terminal and/or size information of the target cell; and determining moving speed information of the terminal and/or size information of the target cell corresponding to a largest quantity of messages; and step 205 is modified to: adjusting a mobility control parameter according to the moving speed information of the terminal and/or the size information of the target cell corresponding to the largest quantity of messages.

Optionally, in the foregoing embodiment, a threshold is set according to a quantity of received messages. Actually, every time after a message is received, namely, after step 204, moving speed information of the terminal and/or size information of the target cell carried in the handover report message may be classified, and a type of moving speed information of the terminal or a type of size information of the target cell or a combination type corresponding to a largest quantity of radio link failure indication messages or handover report messages may be determined; when a quantity of radio link failure indication messages or handover report messages corresponding to any type exceeds the set threshold, step 205 is modified to: adjusting a mobility control parameter according to a type of moving speed information of the terminal or a type of size information of the target cell or a combination type corresponding to a largest quantity of radio link failure indication messages or handover report messages.

In the foregoing embodiment, the process of adjusting a mobility control parameter by the source cell is described in detail. Actually the reestablished cell may also adjust parameters according to the moving speed information of the terminal and/or the size information of the target cell; or a threshold may also be set, and when a quantity of received messages reaches the set threshold, a mobility control parameter is adjusted according to moving speed information of the terminal and/or size information of the target cell corresponding to a largest quantity of messages, and the adjusted mobility control parameter are sent to the terminal.

In an embodiment, the base station of the reestablished sends the moving speed information of the terminal and/or the size information of the target cell to at least one of the base station of the source cell and the base station of the target cell, so that at least one of the base station of the reestablished cell, the base station of the source cell, and the base station of the target cell adjusts the mobility control parameter according to the moving speed information of the terminal and/or the size information of the target cell.

Figure 3:
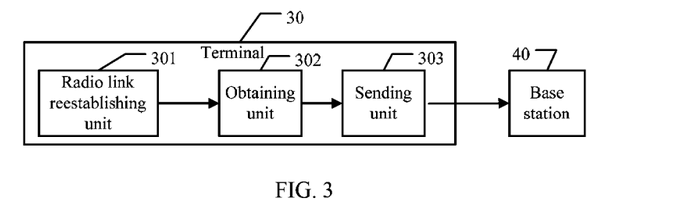
FIG. 3 is a schematic diagram of an embodiment of a terminal according to an embodiment of the present invention.

Referring to FIG. 3, a terminal 30 in an embodiment of the present invention includes a radio link reestablishing unit 301, an obtaining unit 302, and a sending unit 302.

The radio link reestablishing unit 301 is configured to reestablish a radio link with a reestablished cell when the terminal fails to be handed over from a source cell to a target cell, or when the terminal is handed over from a source cell to a target cell successfully and a radio link connection failure occurs on a radio link established between the terminal and the target cell.

The obtaining unit 302 is configured to obtain power of the target cell by using system broadcast or dedicated signaling of the target cell, and obtain size information of the target cell according to the power of the target cell, or obtain size information of the target cell carried in system broadcast or dedicated signaling of the target cell.

The sending unit 303 is configured to send a report message to a base station of the reestablished cell after the radio link reestablishing unit 301 reestablishes the radio link with the reestablished cell, where the report message carries speed information of the terminal and/or the size information of the target cell, so that the base station of the reestablished cell adjusts a mobility control parameter according to the moving speed information of the terminal and/or the size information of the target cell and sends the adjusted mobility control parameter to the terminal.

In the embodiment of the present invention, the radio link reestablishing unit 301 of the terminal 30 reestablishes a radio link with a reestablished cell when the terminal fails to be handed over from a source cell to a target cell, or when the terminal is handed over from a source cell to a target cell successfully and a radio link connection failure occurs on a radio link established between the terminal and the target cell; the obtaining unit 302 obtains size information of the target cell; and the sending unit 303 sends a report message to the reestablished cell after the radio link reestablishing unit 301 reestablishes the radio link with the reestablished cell, where the report message carries speed information of the terminal and/or the size information of the target cell. Compared with the prior art, the terminal provided in the embodiment of the present invention actively reports the speed information of the terminal and/or the size information of the target cell to the reestablished cell, so that the base station of the cell may adjust a mobility control parameter according to the information, thereby ensuring a better balance between a terminal radio link connection failure rate and a terminal ping-pong handover rate.

Figure 4:
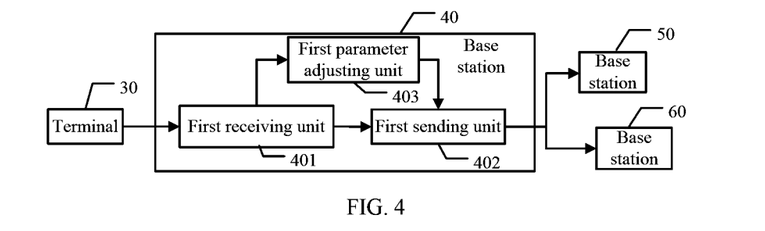
FIG. 4 is a schematic diagram of an embodiment of a base station according to an embodiment of the present invention.

Referring to FIG. 4, an embodiment of a base station in an embodiment of the present invention includes a first receiving unit 401, a first sending unit 402, and a first parameter adjusting unit 403.

The first receiving unit 401 is configured to receive a report message sent by a terminal, where the report message carries moving speed information of the terminal and/or size information of a target cell, and receive an identifier of the target cell or an identifier of a source cell sent by the terminal.

The first sending unit 402 is configured to send a radio link failure indication message to a base station of the target cell or a base station of the source cell according to the identifier of the target cell or the identifier of the source cell, where the radio link failure indication message carries the moving speed information of the terminal and/or the size information of the target cell, so that the base station of the source cell adjusts a mobility control parameter according to the moving speed information of the terminal and/or the size information of the target cell and sends the adjusted mobility control parameter to the terminal.

The first parameter adjusting unit 403 is configured to adjust a mobility control parameter according to the moving speed information of the terminal and/or the size information of the target cell received by the first receiving unit 401.

The first sending unit 402 is further configured to send the mobility control parameter adjusted by the first parameter adjusting unit 403 to the terminal.

In the base station provided in the embodiment of the present invention, the first receiving unit 401 receives a report message sent by a terminal, where the report message carries moving speed information of the terminal and/or size information of a target cell, and receives an identifier of the target cell or an identifier of a source cell sent by the terminal; and the first sending unit 402 is configured to send a radio link failure indication message to a base station of the target cell or a base station of the source cell according to the identifier of the target cell or the identifier of the source cell, so that the base station of the source cell adjusts a mobility control parameter according to the moving speed information of the terminal and/or the size information of the target cell and sends the adjusted mobility control parameter to the terminal. This ensures a better balance between a terminal radio link connection failure rate and a terminal ping-pong handover rate.

In the embodiment of the present invention, the first parameter adjusting unit 403 may further adjust a mobility control parameter according to the moving speed information of the terminal and/or the size information of the target cell received by the first receiving unit 401; and the first sending unit 402 sends the mobility control parameter adjusted by the first parameter adjusting unit to the terminal.

Figure 5:
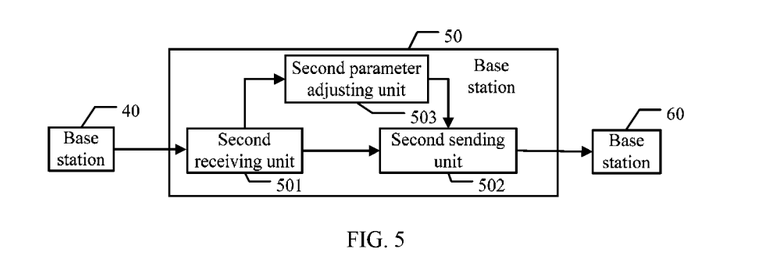
FIG. 5 is a schematic diagram of another embodiment of a base station according to an embodiment of the present invention.

Referring to FIG. 5, another embodiment of a base station in an embodiment of the present invention includes a second receiving unit 501, a second sending unit 502, and a second parameter adjusting unit 503.

The second receiving unit 501 is configured to receive a radio link failure indication message sent by a base station of a reestablished cell, where the radio link failure indication message carries moving speed information of a terminal and/or size information of the target cell.

The second sending unit 502 is configured to send a handover report message to a base station of a source cell, where the handover report message carries the moving speed information of the terminal and/or the size information of the target cell, so that the base station of the source cell adjusts a mobility control parameter according to the moving speed information of the terminal and/or the size information of the target cell and sends the adjusted mobility control parameter to the terminal.

The second parameter adjusting unit 503 is configured to adjust the mobility control parameter according to the moving speed information of the terminal and/or the size information of the target cell received by the second receiving unit 501.

The second sending unit is further configured to send the mobility control parameter adjusted by the second parameter adjusting unit 503 to the terminal.

In the embodiment of the present invention, the second receiving unit 501 receives a radio link failure indication message sent by a base station of a reestablished cell, where the radio link failure indication message carries moving speed information of a terminal and/or size information of the target cell; and the second sending unit 502 sends a handover report message to a base station of a source cell, where the handover report message carries the moving speed information of the terminal and/or the size information of the target cell, so that the base station of the source cell adjusts a mobility control parameter according to the moving speed information of the terminal and/or the size information of the target cell and sends the adjusted mobility control parameter to the terminal. This ensures a better balance between a terminal radio link connection failure rate and a terminal ping-pong handover rate.

In the embodiment of the present invention, the second parameter adjusting unit 503 may further adjust a mobility control parameter according to the moving speed information of the terminal and/or the size information of the target cell received by the second receiving unit 501; and the second sending unit 502 sends the mobility control parameter adjusted by the second parameter adjusting unit to the terminal.

Figure 6:
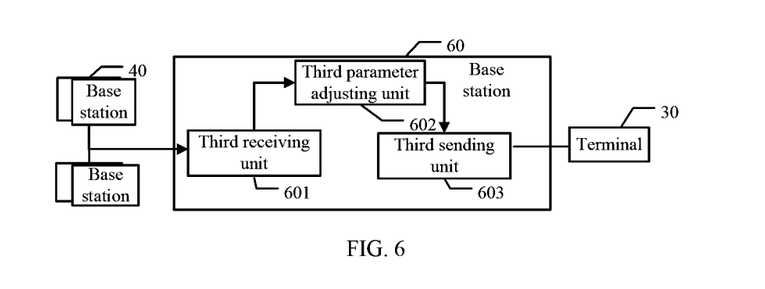
FIG. 6 is a schematic diagram of another embodiment of a base station according to an embodiment of the present invention.

Referring to FIG. 6, an embodiment of a base station in an embodiment of the present invention includes a third receiving unit 601, a third parameter adjusting unit 602, and a third sending unit 603.

The first receiving unit 601 is configured to receive a radio link failure indication message sent by a base station of a reestablished cell or a handover report message sent by a base station of a target cell, where the radio link failure indication message or handover report message carries moving speed information of a terminal and/or size information of the target cell.

The third parameter adjusting unit 602 is configured to adjust a mobility control parameter according to the moving speed information of the terminal and/or the size information of the target cell carried in the radio link failure indication message or handover report message or handover report message received by the first receiving unit 601.

The third sending unit 603 is configured to send the mobility control parameter adjusted by the parameter adjusting unit 602 to the terminal.

In the embodiment of the present invention, the third receiving unit 601 receives a radio link failure indication message sent by a base station of a reestablished cell or a handover report message sent by a base station of a target cell, where the message carries moving speed information of a terminal and/or size information of the target cell; the third parameter adjusting unit 402 adjusts a mobility control parameter according to the moving speed information of the terminal and/or the size information of the target cell carried in the message received by the third receiving unit 601; and the third sending unit 603 sends the mobility control parameter to the terminal after the third parameter adjusting unit 602 adjusts the mobility control parameter. In the embodiment of the present invention, the base station adjusts a mobility control parameter according to the moving speed information of the terminal and/or the size information of the target cell, thereby ensuring a better balance between a terminal radio link connection failure rate and a terminal ping-pong handover rate.

Figure 7:
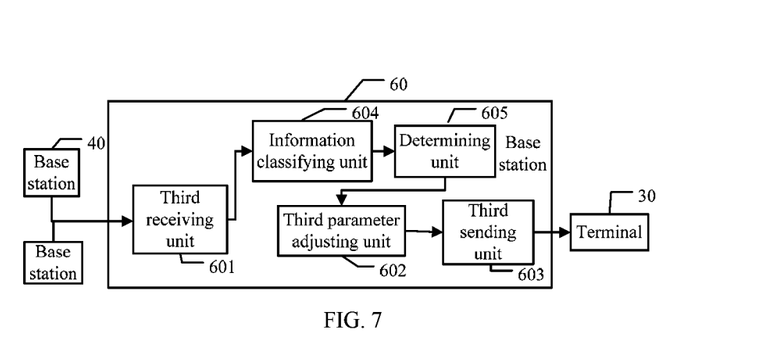
FIG. 7 is a schematic diagram of another embodiment of a base station according to an embodiment of the present invention.

Referring to FIG. 7, another embodiment of a base station in an embodiment of the present invention further includes an information classifying unit 604, a determining unit 605, a third parameter adjusting unit 602, and a third sending unit 603.

The information classifying unit 604 is configured to: classify moving speed information of the terminal carried in the radio link failure indication messages or handover report messages; or classify size information of the target cell carried in the radio link failure indication messages or handover report messages.

The determining unit 605 is configured to: after the information classifying unit 604 classifies moving speed information of the terminal, determine quantities of radio link failure indication messages or handover report messages corresponding to types of moving speed information of the terminal after the classification, and determine a type of moving speed information of the terminal corresponding to a largest quantity of radio link failure indication messages or handover report messages; or after the information classifying unit 604 classifies size information of the target cell, determine quantities of radio link failure indication messages or handover report messages corresponding to types of size information of the target cell after the classification, and determine a type of size information of the target cell corresponding to a largest quantity of radio link failure indication messages or handover report messages; or determine combination types of types of size information of the target cell and types of moving speed information of the terminal carried in the radio link failure indication messages or handover report messages, determine quantities of radio link failure indication messages or handover report messages corresponding to the combination types, and determine a combination type corresponding to a largest quantity of radio link failure indication messages or handover report messages.

The parameter adjusting unit 602 is further configured to: after the determining unit 605 determines the type of moving speed information of the terminal corresponding to the largest quantity of radio link failure indication messages or handover report messages, adjust the mobility control parameter according to the type of moving speed information of the terminal corresponding to the largest quantity of radio link failure indication messages or handover report messages; or after the determining unit 605 determines the type of size information of the target cell corresponding to the largest quantity of radio link failure indication messages or handover report messages, adjust a mobility control parameter according to the type of size information of the target cell corresponding to the largest quantity of radio link failure indication messages or handover report messages; or after the determining unit 605 determines the combination type corresponding to the largest quantity of radio link failure indication messages or handover report messages, adjust a mobility control parameter according to the combination type corresponding to the largest quantity of radio link failure indication messages or handover report messages.

The first sending unit 603 is further configured to send the mobility control parameter adjusted by the parameter adjusting unit 602 to the terminal.

In the embodiment of the present invention, a threshold is set at a base station side. When a quantity of messages received by the third receiving unit 601 of the base station 60 exceeds the set threshold, the information classifying unit 604 classifies moving speed information of the terminal and/or size information of the target cell; the determining unit 605 determines moving speed information of the terminal and/or size information of the target cell corresponding to a largest quantity of messages; the third parameter adjusting unit 602 adjusts a mobility control parameter according to the moving speed information of the terminal and/or the size information of the target cell corresponding to the largest quantity of messages; and the third sending unit 603 sends the adjusted mobility control parameter to the terminal. The base station adjusts a mobility control parameter according to the moving speed information of the terminal and/or the size information of the target cell carried in the message sent by the terminal or another base station, thereby ensuring a better balance between a terminal link connection failure rate and a terminal ping-pong handover rate. The base station in the embodiment corresponding to FIG. 4 or FIG. 5 may also include an information classifying unit and a determining unit. The specific execution process is the same as that of the base station corresponding to FIG. 7.

Figure 8:
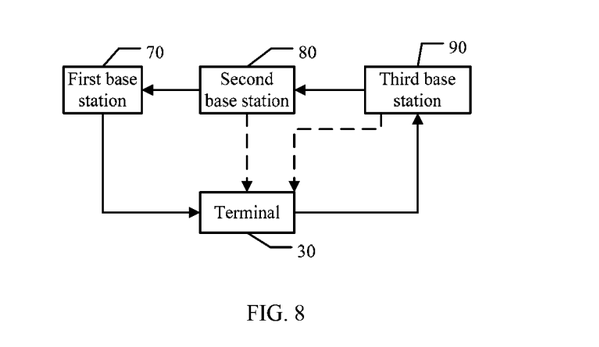
FIG. 8 is a schematic diagram of an embodiment of a system according to an embodiment of the present invention.

Referring to FIG. 8, an embodiment of a system for adjusting control parameters according to an embodiment of the present invention includes a terminal 30, a first base station 70, a second base station 80, and a third base station 90.

When the terminal 30 is handed over from the first base station 70 to the second base station 80 successfully and a radio link connection failure occurs on a radio link established between the terminal 30 and the second base station 80, the terminal 30 reestablishes a radio link with the third base station 90 and sends a report message to the third base station 90, where the report message carries speed information of the terminal and/or size information of the target cell.

After the third base station 90 receives the report message sent by the terminal 30 and receives an identifier of the target cell or an identifier of a source cell sent by the terminal, the third base station 90 sends a radio link failure indication message to the second base station 80 according to the identifier of the target cell or the identifier of the source cell, where the radio link failure indication message carries the moving speed information of the terminal and/or the size information of the target cell.

After the second base station 80 receives the radio link failure indication message sent by the third base station 90, the second base station 80 sends a handover report message to the first base station 70 according to the identifier of the source cell, where the handover report message carries the moving speed information of the terminal and/or the size information of the target cell.

The first base station receives the handover report message sent by the second base station 80, where the handover report message carries the moving speed information of the terminal and/or the size information of the target cell.

The first base station 70 adjusts a mobility control parameter according to the moving speed information of the terminal and/or the size information of the target cell, and sends the adjusted mobility control parameter to the terminal 30.

In the embodiment of the present invention, the terminal sends a report message to the third base station, where the report message carries speed information of the terminal and/or size information of the target cell; the third base station sends a radio link failure indication message to the second base station; the second base station sends a handover report message to the first base station, where the handover report message carries the moving speed information of the terminal and/or the size information of the target cell; and the first base station adjusts a mobility control parameter according to the moving speed information of the terminal and/or the size information of the target cell and sends the adjusted mobility control parameter to the terminal. The base station adjusts a mobility control parameter according to the moving speed information of the terminal and/or the size information of the target cell carried in the message sent by another base station, thereby ensuring a better balance between a terminal radio link connection failure rate and a terminal ping-pong handover rate.

Optionally, in the embodiment corresponding to FIG. 8, the second base station and third base station may also adjust parameters, and send the adjusted mobility control parameter to the terminal.

Figure 9:
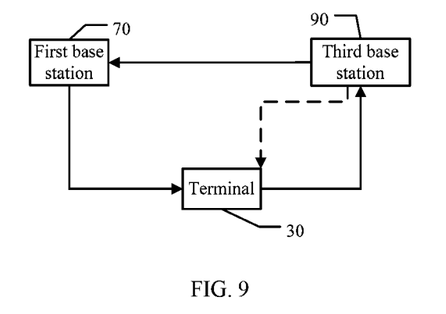
FIG. 9 is a schematic diagram of another embodiment of a system according to an embodiment of the present invention.

As shown in FIG. 9, another embodiment of a system for adjusting control parameters according to an embodiment of the present invention includes a terminal 30, a first base station 70, a second base station 80, and a third base station 90.

When the terminal 30 fails to be handed over from the first base station 70 to the second base station 80, the terminal 30 reestablishes a radio link with the third base station 90, and the terminal sends a report message to the third base station 90, where the report message carries speed information of the terminal and/or size information of a target cell.

After the third base station 90 receives the report message sent by the terminal 30, the third base station 90 sends a radio link failure indication message to the first base station 70 according to an identifier of a source cell, where the radio link failure indication message carries the moving speed information of the terminal and/or the size information of the target cell.

The first base station 70 receives the radio link failure indication message sent by the third base station 90, where the radio link failure indication message carries the moving speed information of the terminal and/or the size information of the target cell.

The first base station 70 adjusts a mobility control parameter according to the moving speed information of the terminal and/or the size information of the target cell, and sends the adjusted mobility control parameter to the terminal 30.

In the embodiment of the present invention, the terminal sends a report message to the third base station, where the report message carries speed information of the terminal and/or size information of a target cell; the third base station sends a radio link failure indication message to the first base station, where the radio link failure indication message carries the moving speed information of the terminal and/or the size information of the target cell; and the first base station adjusts a mobility control parameter according to the moving speed information of the terminal and/or the size information of the target cell and sends the adjusted mobility control parameter to the terminal. The base station adjusts a mobility control parameter according to the moving speed information of the terminal and/or the size information of the target cell carried in the message sent by another base station, thereby ensuring a better balance between a terminal radio link connection failure rate and a terminal ping-pong handover rate.

Optionally, in the embodiment corresponding to FIG. 8, the third base station may also adjust parameters, and send the adjusted mobility control parameter to the terminal.

A person of ordinary skill in the art may understand that all or a part of steps of various methods in the foregoing embodiments may be implemented by a program instructing relevant hardware. The program may be stored in a computer readable storage medium. The storage medium may include a ROM, a RAM, a magnetic disk, or an optical disc, and so on.

A method, terminal, base station, and system for adjusting control parameters that are provided in the embodiments of the present invention are introduced in detail in the foregoing. In this specification, the principles and implementation manners of the present invention are described herein by using specific examples. The foregoing descriptions of the embodiments are merely intended to help understand the methods of the present invention and the core ideas of the present invention. Meanwhile, a person of ordinary skill in the art may make modifications to the specific implementation manners and application scopes according to the ideas of the present invention. In conclusion, the content of the specification shall not be construed as a limitation to the present invention.

What is claimed is:

1. A method for adjusting a control parameter, comprising:
when a terminal fails to be handed over from a source cell to a target cell, or when the terminal is handed over from the source cell to the target cell successfully and a radio link connection failure occurs on a radio link established between the terminal and the target cell, reestablishing, by the terminal, the radio link with a reestablished cell; and
sending, by the terminal, a report message to a base station of the reestablished cell, wherein the report message carries (a) moving speed information of the terminal and (b) size information of the target cell, so that the base station of the reestablished cell adjusts a mobility control parameter according to at least one of the moving speed information of the terminal and the size information of the target cell and sends the adjusted mobility control parameter to the terminal;
wherein the moving speed information of the terminal comprises moving state information of the terminal;
the base station adjusting the mobility control parameter further comprises:
adjusting a scale factor corresponding to the moving state information of the terminal;
adjusting a scale factor corresponding to the size information of the target cell;
adjusting a current handover control parameter by multiply the adjusted scale factor corresponding to the moving state information of the terminal and the adjusted scale factor corresponding to the size information of the target cell; and
obtaining the adjusted mobility control parameter comprising the adjusted scale factor corresponding to the moving state information of the terminal, the adjusted scale factor corresponding to the size information of the target cell and the adjusted current handover control parameter.

2. The method for adjusting control parameters according to claim 1, wherein the moving speed information of the terminal comprises a moving speed value of the terminal,
wherein the moving state information of the terminal comprises the terminal being in one of the following states: a high moving state, a medium moving state, and a normal moving state.

3. The method for adjusting control parameters according to claim 1, wherein:
the size information of the target cell comprises the target cell being one of the following: a large cell, a medium cell, a small cell, and a pico cell.

4. The method for adjusting control parameters according to claim 1, wherein the report message further carries an event type flag, and the event type flag indicates that an event type comprises a radio link failure or a cell handover failure.

5. The method for adjusting control parameters according to claim 1, further comprising:
obtaining, by the terminal, power of the target cell by using system broadcast or dedicated signaling of the target cell, and obtaining the size information of the target cell according to the power of the target cell.

6. A method for adjusting control parameters, comprising:
receiving, by a base station of a reestablished cell, a report message sent by a terminal, wherein the report message carries (a) moving speed information of the terminal and (b) size information of a target cell, and receiving an identifier of the target cell or an identifier of a source cell sent by the terminal; and
sending, by the base station of the reestablished cell, a radio link failure indication message to a base station of the target cell or a base station of the source cell according to the identifier of the target cell or the identifier of the source cell, wherein the radio link failure indication message carries at least one of the moving speed information of the terminal and the size information of the target cell, so that the base station of the target cell or the base station of the source cell adjusts a mobility control parameter according to the moving speed information of the terminal and the size information of the target cell and sends the adjusted mobility control parameter to the terminal;
wherein the moving speed information of the terminal comprises moving state information of the terminal;
the base station of the target cell or the source cell adjusting the mobility control parameter further comprises:
adjusting a scale factor corresponding to the moving state information of the terminal;
adjusting a scale factor corresponding to the size information of the target cell;
adjusting a current handover control parameter by multiplying the adjusted scale factor corresponding to the moving state information of the terminal and the adjusted scale factor corresponding to the size information of the target cell; and
obtaining the adjusted mobility control parameter comprising the adjusted scale factor corresponding to the moving state information of the terminal, the adjusted scale factor corresponding to the size information of the target cell and the adjusted current handover control parameter.

7. The method for adjusting control parameters according to claim 6, wherein after the receiving, by the base station of the reestablished cell, the report message sent by the terminal, the method further comprises:
adjusting, by the base station of the reestablished cell, the mobility control parameter according to at least one of the moving speed information of the terminal and the size information of the target cell, and sending the adjusted mobility control parameter to the terminal.

8. The method for adjusting control parameters according to claim 6, wherein when a quantity of report messages sent by the terminal and received by the base station of the reestablished cell exceeds a set threshold, the method further comprises:

classifying the moving speed information of the terminal carried in the report messages, determining quantities of the report messages corresponding to types of the moving speed information of the terminal after the classification, determining a type of the moving speed information of the terminal corresponding to a largest quantity of the report messages, adjusting the mobility control parameter according to the type of the moving speed information of the terminal corresponding to the largest quantity of the report messages, and sending the adjusted mobility control parameter to the terminal.

9. A terminal, comprising:

a radio link reestablishing unit, configured to reestablish a radio link with a reestablished cell when the terminal fails to be handed over from a source cell to a target cell, or when the terminal is handed over from the source cell to the target cell successfully and a radio link connection failure occurs on a radio link established between the terminal and the target cell; and a sending unit, configured to send a report message to a base station of the reestablished cell after the radio link reestablishing unit reestablishes the radio link with the reestablished cell, wherein the report message carries (a) moving speed information of the terminal and (b) size information of the target cell, so that the base station of the reestablished cell adjusts a mobility control parameter according to at least one of the moving speed information of the terminal and the size information of the target cell and sends the adjusted mobility control parameter to the terminal;

wherein the moving speed information of the terminal comprises moving state information of the terminal;

the base station of the reestablished cell adjusting the mobility control parameter further comprises:

adjusting a scale factor corresponding to the moving state information of the terminal;

adjusting a scale factor corresponding to the size information of the target cell;

adjusting a current handover control parameter by multiplying the adjusted scale factor corresponding to the moving state information of the terminal and the adjusted scale factor corresponding to the size information of the target cell; and obtaining the adjusted mobility control parameter comprising the adjusted scale factor corresponding to the moving state information of the terminal, the adjusted scale factor corresponding to the size information of the target cell and the adjusted current handover control parameter.

10. The terminal according to claim 9, further comprising:

an obtaining unit, configured to obtain power of the target cell by using system broadcast or dedicated signaling of the target cell, and obtain the size information of the target cell according to the power of the target cell.

11. A base station, comprising:

a receiving unit, configured to receive a report message sent by a terminal, wherein the report message carries (a) moving speed information of the terminal and (b) size information of a target cell, and receive an identifier of the target cell or an identifier of a source cell sent by the terminal; and a sending unit, configured to send a radio link failure indication message to a base station of the target cell or a base station of the source cell according to the identifier of the target cell or the identifier of the source cell, wherein the radio link failure indication message carries at least one of the moving speed information of the terminal and the size information of the target cell, so that the base station of the target cell or the base station of the source cell adjusts a mobility control parameter according to at least one of the moving speed information of the terminal and the size information of the target cell and sends the adjusted mobility control parameter to the terminal;

wherein the moving speed information of the terminal comprises moving state information of the terminal;

the base station of the target cell or the source cell adjusting the mobility control parameter further comprises:

adjusting a scale factor corresponding to the moving state information of the terminal;

adjusting a scale factor corresponding to the size information of the target cell;

adjusting a current handover control parameter by multiplying the adjusted scale factor corresponding to the moving state information of the terminal and the adjusted scale factor corresponding to the size information of the target cell; and obtaining the adjusted mobility control parameter comprising the adjusted scale factor corresponding to the moving state information of the terminal, the adjusted scale factor corresponding to the size information of the target cell and the adjusted current handover control parameter.

12. The base station according to claim 11, further comprising:

a parameter adjusting unit, configured to adjust the mobility control parameter according to at least one of the moving speed information of the terminal and the size information of the target cell received by the first receiving unit;

wherein the sending unit is further configured to send the mobility control parameter adjusted by the parameter adjusting unit to the terminal.

13. The method for adjusting control parameters according to claim 1, further comprising:

obtaining, by the terminal, the size information of the target cell carried in system broadcast or dedicated signaling of the target cell.

14. The method for adjusting control parameters according to claim 6, wherein when a quantity of report messages sent by the terminal and received by the base station of the reestablished cell exceeds a set threshold, the method further comprises:

classifying the size information of the target cell carried in the report messages, determining quantities of the report messages corresponding to types of the size information of the target cell after the classification, determining a type of the size information of the target cell corresponding to a largest quantity of the report messages, adjusting the mobility control parameter according to the type of the size information of the target cell corresponding to the largest quantity of the report messages, and sending the adjusted mobility control parameter to the terminal.

15. The method for adjusting control parameters according to claim 6, wherein when a quantity of report messages sent by the terminal and received by the base station of the reestablished cell exceeds a set threshold, the method further comprises:

determining combination types of the size information of the target cell and types of the moving speed information of the terminal carried in the report messages, determining quantities of the report messages corresponding to the combination types, determining a combination type corresponding to a largest quantity of the report messages, adjusting the mobility control parameter according to the combination type corresponding to the largest quantity of the report messages, and sending the adjusted mobility control parameter to the terminal.

16. The terminal according to claim 9, further comprising:

an obtaining unit, configured to obtain the size information of the target cell carried in system broadcast or dedicated signaling of the target cell.

* * * * *